United States Patent
Rogers et al.

(10) Patent No.: US 9,992,824 B2
(45) Date of Patent: Jun. 5, 2018

(54) TIME ESTIMATION FOR ENERGY APPLICATION IN AN RF ENERGY TRANSFER DEVICE

(75) Inventors: Steven Robert Rogers, Emek Sorek (IL); Daniella Atzmony, Shoham (IL)

(73) Assignee: GOJI LIMITED, Hamilton (BM)

( * ) Notice: Subject to any disclaimer, the term of this patent is extended or adjusted under 35 U.S.C. 154(b) by 1370 days.

(21) Appl. No.: 13/282,861

(22) Filed: Oct. 27, 2011

(65) Prior Publication Data

US 2012/0103973 A1    May 3, 2012

Related U.S. Application Data

(60) Provisional application No. 61/408,295, filed on Oct. 29, 2010.

(51) Int. Cl.
| H05B 6/64 | (2006.01) |
| H05B 6/66 | (2006.01) |
| H05B 6/68 | (2006.01) |
| H05B 6/70 | (2006.01) |

(52) U.S. Cl.
CPC ............ *H05B 6/668* (2013.01); *H05B 6/686* (2013.01); *H05B 6/687* (2013.01); *H05B 6/688* (2013.01); *H05B 6/705* (2013.01); *Y02B 40/143* (2013.01)

(58) Field of Classification Search
CPC ... H05B 6/64; A47J 27/62; A47J 37/06; A47J 37/08; A47J 43/14
USPC ............ 219/680–682; 99/332, 497, 468, 401
See application file for complete search history.

(56) References Cited

U.S. PATENT DOCUMENTS

| 4,317,977 | A | * | 3/1982 | Buck ............................ 219/709 |
| 4,434,342 | A | | 2/1984 | Schubring |
| 4,441,002 | A | | 4/1984 | Teich et al. |
| 4,447,693 | A | * | 5/1984 | Buck ............................ 219/705 |
| 4,541,729 | A | | 9/1985 | Schubring |
| 4,647,746 | A | | 3/1987 | Eke |
| 4,794,219 | A | | 12/1988 | Eke |
| 4,841,111 | A | | 6/1989 | Kokkeler et al. |
| 5,695,672 | A | * | 12/1997 | Kim ............................ 219/709 |
| 5,893,051 | A | | 4/1999 | Tomohiro |
| 5,945,018 | A | * | 8/1999 | Halen .......................... 219/492 |
| 6,067,475 | A | * | 5/2000 | Graves et al. ................ 607/101 |
| 6,097,019 | A | | 8/2000 | Lewis et al. |
| 6,299,921 | B1 | | 10/2001 | Loffler et al. |
| 6,486,453 | B1 | * | 11/2002 | Bales et al. .................. 219/702 |

(Continued)

FOREIGN PATENT DOCUMENTS

| EP | 0526297 | | 2/1993 | |
| GB | 2391154 A | * | 1/2004 | ............... H05B 6/72 |

*Primary Examiner* — Michael Laflame, Jr.
(74) *Attorney, Agent, or Firm* — Greenblum & Bernstein, P.L.C.

(57) ABSTRACT

An apparatus configured to apply electromagnetic energy to an object may include an energy application zone adapted to receive at least a portion of an object and a source configured to supply RF energy to the energy application zone. The apparatus may also include at least one processor configured to: cause the source to supply RF energy to the energy application zone; determine a value indicative of a rate of energy absorption by a load, including at least a portion of the object, during a first period of time; and determine, based on the value indicative of the rate of energy absorption by the load, an estimated amount of time to obtain a desired characteristic in at least a portion of the object.

40 Claims, 4 Drawing Sheets

(56) References Cited

U.S. PATENT DOCUMENTS

| | | | |
|---|---|---|---|
| 6,867,402 B1* | 3/2005 | Schulte | 219/704 |
| 7,030,600 B2 | 4/2006 | Adlerstein et al. | |
| 7,167,008 B2* | 1/2007 | Tsuji | 324/644 |
| 8,839,527 B2 | 9/2014 | Ben-Shmuel et al. | |
| 2008/0193614 A1 | 8/2008 | Greiner et al. | |
| 2008/0290087 A1 | 11/2008 | Ben-Shmuel et al. | |
| 2009/0057302 A1 | 3/2009 | Ben-Shmuel et al. | |
| 2009/0061070 A1 | 3/2009 | Greiner et al. | |
| 2009/0236333 A1 | 9/2009 | Ben-Shmuel et al. | |
| 2009/0274805 A1 | 11/2009 | Schonemann | |
| 2010/0006564 A1 | 1/2010 | Ben-Shmuel et al. | |
| 2010/0187224 A1* | 7/2010 | Hyde et al. | 219/720 |
| 2011/0031236 A1* | 2/2011 | Ben-Shmuel | H05B 6/6402 |
| | | | 219/620 |
| 2012/0111856 A1 | 5/2012 | Nobue et al. | |
| 2013/0080098 A1 | 3/2013 | Hadad et al. | |
| 2013/0200065 A1 | 8/2013 | Libman et al. | |
| 2013/0200066 A1 | 8/2013 | Gelbart et al. | |
| 2013/0306627 A1 | 11/2013 | Libman et al. | |
| 2014/0247060 A1 | 9/2014 | Ben Haim et al. | |
| 2014/0287100 A1 | 9/2014 | Libman | |
| 2014/0345152 A1 | 11/2014 | Ben-Shmuel et al. | |
| 2015/0034632 A1 | 2/2015 | Brill et al. | |
| 2015/0070029 A1 | 3/2015 | Libman et al. | |

* cited by examiner

US 9,992,824 B2

TIME ESTIMATION FOR ENERGY APPLICATION IN AN RF ENERGY TRANSFER DEVICE

The present application claims priority to U.S. Provisional Patent Application No. 61/408,295, which was filed on Oct. 29, 2010, and which is fully incorporated herein by reference.

TECHNICAL FIELD

This application relates to apparatuses and methods for applying electromagnetic energy to an object.

BACKGROUND

Electromagnetic waves may be used to supply energy to various types of objects. In a microwave oven, for example, which is an example of an electromagnetic energy application device, microwave radiation can be used to transfer electromagnetic energy from an energy source to the oven's cavity. Some of the energy associated with the microwave radiation that is transferred to the oven's cavity is absorbed by the object and converted to thermal energy, which can cause heating of the object.

In a conventional microwave oven, to heat an object such as food, a user typically selects a length of time that corresponds to a desired duration during which microwave radiation is to be supplied. In some cases, the user may also select a power level of the microwave radiation to be supplied to the food. Often, the user determines the desired duration and/or power level based on his/her experience or according to a recipe or an instruction. The selected time and/or power level, however, do not always yield intended results. For example, food can be overcooked or undercooked.

SUMMARY

Some embodiments of the present invention include an apparatus for applying electromagnetic energy to an object. The apparatus may include at least one processor. The at least one processor may be configured to cause the source to supply RF energy to the energy application zone, to determine a value indicative of a rate of energy absorption by a load including at least a portion of the object during a first period of time, and to determine, based on the value indicative of the rate of energy absorption by the load, a predicted amount of time to obtain a desired characteristic in at least a portion of the object.

The apparatus may further include an energy application zone adapted to receive at least a portion of the object, and/or a source configured to supply RF energy to the energy application zone.

Some embodiments of the present invention include an apparatus for applying electromagnetic energy to an object at least one processor. The at least one processor may be configured to prompt a user for input relating to a desired cooking time, to cause the source to supply RF energy to the energy application zone, to determine a value indicative of a rate of energy absorption by a load, including at least a portion of the object, during a first period of time, and to determine, based on the value indicative of the rate of energy absorption by the load, a predicted amount of time to obtain a desired characteristic in at least a portion of the object.

The apparatus may further include an energy application zone adapted to receive at least a portion of the object, and/or a source configured to supply RF energy to the energy application zone.

Some embodiments of the present invention include a method for applying electromagnetic energy to an object. The method may include supplying electromagnetic energy to an object in an energy application zone, determining a value indicative of a rate of energy absorption by a load during a first period of time that the electromagnetic energy is supplied to the object, determining, based on the value indicative of the rate of energy absorption by the load, a predicted amount of time to obtain a desired characteristic in the object, and indicating to a user the predicted amount of time.

Some embodiments of the present invention include a method for applying electromagnetic energy to an object. The method may include receiving an input of a desired cooking time, supplying electromagnetic energy at a certain power to an object in an energy application zone, determining a value indicative of a rate of energy absorption by a load during a first period of time that the electromagnetic energy is supplied to the object, and determining, based on the value indicative of the rate of energy absorption by the load, a predicted amount of time to obtain a desired characteristic in the object.

The preceding summary is not intended to restrict in any way the scope of the claimed invention. In addition, it is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments and exemplary aspects of the present invention and, together with the description, explain principles of the invention. In the drawings.

DESCRIPTION OF EXEMPLARY EMBODIMENTS

Reference will now be made in detail to exemplary disclosed embodiments, examples of which are illustrated in the accompanying drawings. When appropriate, the same reference numbers are used throughout the drawings to refer to the same or like parts.

In one respect, some embodiments of the invention may involve apparatuses and methods for supplying electromagnetic energy to an object in an energy application zone.

For exemplary purposes, this disclosure contains a number of examples of electromagnetic energy used for heating. These descriptions are provided to illustrate exemplary principles of the disclosed embodiments. These embodiments, and other similar embodiments, may provide benefit for various products and industrial, commercial, and consumer processes involving the application of energy, regardless of whether the application of energy results in a temperature rise. In embodiments consistent with the present disclosure, electromagnetic energy may be applied to an object for heating, combusting, thawing, defrosting, cooking, drying, accelerating reactions, expanding, evaporating, fusing, causing or altering biologic processes, medical treatments, preventing freezing or cooling, maintaining the object within a desired temperature range, or any other application where it is desirable to apply energy.

Moreover, reference to an object to which electromagnetic energy is applied is not limited to a particular form. An object may include a liquid, solid, or gas, depending upon the particular process with which the invention is utilized, and the object may include composites or mixtures of matter in one or more differing phases. Further, although the term object is in the singular form, it may refer to multiple items or detached parts or components. Thus, by way of non-limiting example, the term object may encompass such matter as food to be thawed or cooked; clothes or other material to be dried; frozen material (e.g. organs) to be thawed; chemicals to be reacted; fuel or other combustible material to be combusted; hydrated material to be dehydrated, gases to be expanded; liquids to be heated, boiled, or vaporized, frozen liquids to be thawed, blood or blood components (e.g. blood plasma or red blood cells) to be thawed and/or warmed, materials to be manufactured, components to be connected, or any other material for which there is a desire to apply electromagnetic energy.

Figure 1:
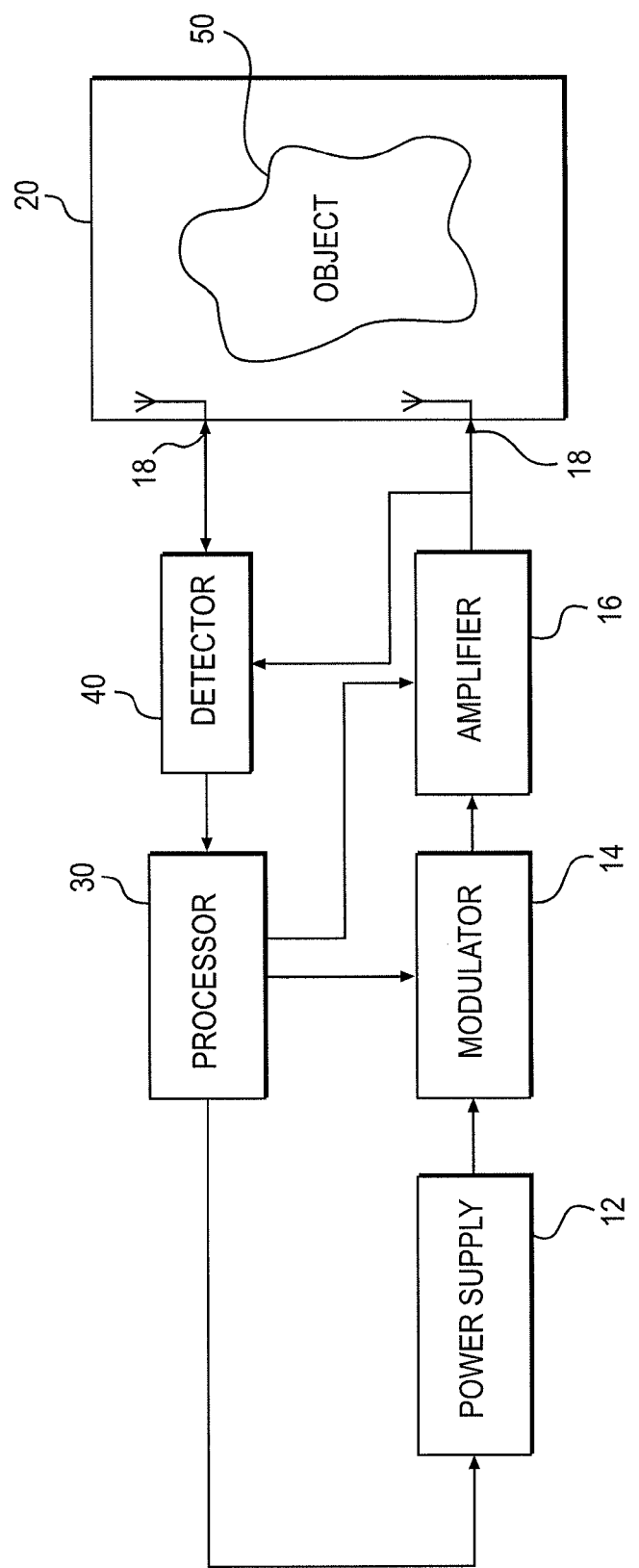
FIG. 1 is a diagrammatic representation of an electromagnetic energy transfer device for applying electromagnetic energy to an object, in accordance with an exemplary disclosed embodiment.

FIG. 1 provides a diagrammatic representation of an exemplary electromagnetic energy transfer device 10 for applying electromagnetic energy to an object. This device may include any suitable components for delivering energy to an object. As shown in FIG. 1, energy transfer device 10 may include a power supply 12, a modulator 14, an amplifier 16, one or more radiating elements 18, and an energy application zone 20. Energy application zone 20 may be adapted to at least partially receive an object 50 into which energy is to be delivered. Electromagnetic energy transfer device 10 may also include at least one processor 30 and a detector 40.

Energy application zone 20 may include any void, location, region, or area where electromagnetic energy may be applied. It may include a hollow, or may be filled or partially filled with liquids, solids, gases, or combinations thereof. In certain embodiments, energy application zone 20 may include the interior of an enclosure, interior of a partial enclosure (e.g. conveyor belt system), interior of a conduit, open space, solid, or partial solid, which allows for the existence, propagation, and/or resonance of electromagnetic waves. The zone may be permanent or may be temporarily constituted for purposes of energy application. For purposes of this disclosure, the term cavity may be used to refer to an energy application zone, but the term cavity is not meant to imply any particular physical structure other than an area in which electromagnetic energy may be applied.

Energy application zone 20 may be located in an oven, chamber, tank, dryer, thawer, dehydrator, reactor, engine, chemical or biological processing apparatus, incinerator, material shaping or forming apparatus, conveyor, combustion zone, or any area where it may be desirable to apply energy. Electromagnetic energy application zone 20 may include an electromagnetic resonator (also known as cavity resonator, resonant cavity, or cavity). The electromagnetic energy may be delivered to an object when the object or at least a portion thereof is located in energy application zone 20.

Energy application zone 20 may have a predetermined configuration or a configuration that is otherwise determinable, so long as physical aspects of the energy application zone are known at a time of energy application. In this context, a configuration of energy application zone 20 may include any arrangement, position, and/or orientation of components that together define one or more attributes of energy application zone 20.

Energy application zone 20 may assume any shape that permits electromagnetic wave propagation inside the energy application zone. For example, all or part of energy application zone 20 may have a cross-section that is spherical, rectangular, toroidal, circular, triangular, oval, pentagonal, hexagonal, octagonal, elliptical, or any other shape or combination of shapes suitable for providing electromagnetic wave propagation therein. Energy application zone 20 may be closed, i.e., completely enclosed by conductor materials, at least partially bounded, or open (i.e., having non-bounded opening). The general methodology of the disclosed embodiments is not limited to any particular cavity shape, configuration, or degree of closure, although in some applications, a high degree of closure may be preferred.

In accordance with some embodiments of the invention, energy application zone 20 may support at least one resonant wavelength. For example, energy application zone 20 may be designed with dimensions permitting it to be resonant in a predetermined range of frequencies (e.g., the UHF or microwave range of frequencies, such as between 300 MHz and 3 GHz, or between 800 MHz and 1 GHZ). Depending on the intended application, the dimensions of energy application zone 20 may also be designed to permit resonances in other ranges of frequencies in the electromagnetic spectrum. The terms resonant or resonance refer to the tendency of electromagnetic waves to oscillate in the energy application zone at larger amplitudes at some frequencies (known as resonance frequencies) than at others. Electromagnetic waves resonating at a particular resonance frequency may have a corresponding resonance wavelength that is inversely proportional to the resonance frequency, determined via $\lambda=c/f$, where $\lambda$ is the resonance wavelength, f is the resonance frequency, and c is the propagating speed of the electromagnetic waves in the energy application zone. The propagating speed may change depending on the medium through which the wave propagates. Therefore, when the energy application zone comprises more than one material, c may not be uniquely defined. Nevertheless, the resonance wavelength may be uniquely determined using a slightly different relationship, including, for example, using an estimation based on c of the major component or an average of the c of miscellaneous components, or any other suitable technique.

The term electromagnetic energy, as used herein, includes any or all portions of the electromagnetic spectrum, including, but not limited to, radio frequency (RF), infrared (IR), near infrared, visible light, ultraviolet, etc. In some cases, applied electromagnetic energy may include RF energy having wavelengths within a range of about 100 km to 1 mm, which corresponds to a frequency range of about 3 KHz to 300 GHz. In some cases, RF energy within a narrower frequency range, e.g., 1 MHz-100 GHz, may be applied. Applying energy in the RF portion of the electromagnetic spectrum is referred herein as applying RF energy. Microwave and ultra high frequency (UHF) energy, for example, are both within the RF range. In some other examples, the applied electromagnetic energy may fall only within one or more ISM frequency bands, for example, between 433.05 and 434.79 MHz, between 902 and 928 MHz, between 2400 and 2500 MHz, and/or between 5725 and 5875 MHz. Even though examples of the invention are described herein in connection with the application of RF energy, these descriptions are provided to illustrate a few exemplary principles of the invention, and are not intended to limit the invention to any particular portion of the electromagnetic spectrum.

Returning to FIG. 1, electromagnetic energy transfer device 10 may include one or more sources configured to deliver electromagnetic energy to the energy application zone. The source may be referred to herein also as a source of electromagnetic (or RF) energy or source of electromagnetic (or RF) radiation. For example, and as illustrated in FIG. 1, the source may include at least one power supply 12 configured to generate electromagnetic waves that carry electromagnetic energy. For purposes of this disclosure, a source may include any component(s) suitable for generating and/or delivering electromagnetic energy. Consistent with some embodiments of the invention, electromagnetic energy may be supplied or transmitted to the energy application zone in the form of propagating electromagnetic waves (i.e., electromagnetic radiation) having certain wavelengths or frequencies. Propagating electromagnetic waves may include resonating waves, evanescent waves, and waves that travel through a medium in any other manner. Electromagnetic radiation carries energy that may be transferred to a matter with which it interacts.

Power supply 12 may include any device(s) and/or component(s) suitable for generating electromagnetic radiation. For example, power supply 12 may include an electromagnetic field generator, electromagnetic flux generator, or any mechanism for generating vibrating electrons. In certain embodiments, power supply 12 may include a magnetron configured to generate microwave waves at a predetermined wavelength or frequency. Alternatively, power supply 12 may include a semiconductor oscillator, such as a voltage controlled oscillator, configured to generate AC waveforms (e.g., AC voltage or current) with a constant or varying frequency. AC waveforms may include sinusoidal waves, square waves, pulsed waves, triangular waves, or another type of waveforms with alternating polarities.

In some embodiments, the source of electromagnetic radiation may also include at least one modulator 14 configured to modify one or more characteristic parameters of the electromagnetic waves generated by power supply 12. For example, modulator 14 may be configured to modify one or more parameters of a periodic waveform, including amplitude (e.g., an amplitude difference between different radiating elements), phase, and/or frequency. In some embodiments, any of these parameters may be modified through modulation, based on aspects of another signal, e.g., a modulating signal. In some embodiments, the modulating signal may have a frequency lower than a frequency associated with the periodic waveform (i.e., carrier wave).

Modulator 14 may include one or more phase modulators, frequency modulators, amplitude modulators, or any combination thereof configured to modify the phase, frequency, and amplitude of the AC waveform generated by power supply 12. In some embodiments, modulator 14 may be integrated as part of power supply 12, such that the AC waveforms generated by power supply 12 may have at least one of a modulated frequency, a varying phase, and a varying amplitude over time.

The source of electromagnetic energy in energy transfer device 10 may also include an amplifier 16, which may include any device, components, or circuitry configured to scale up an input signal to a desired level. Amplifier 16 may be configured to amplify the AC waveforms generated by power supply 12 either before or after they are modified by modulator 14. Amplifier 16 may include, for example, a power amplifier including one or more power transistors. As another example, amplifier 16 may include a step-up transformer having more turns in the secondary winding than in the primary winding. In other embodiments, amplifier 16 may also include a power electronic device such as an AC-to-DC-to-AC converter.

The source of electromagnetic energy in energy transfer device 10 may also comprise at least one radiating element 18 configured to transmit electromagnetic radiation to energy application zone 20. Radiating element 18 may include one or more waveguides and/or one or more antennas (also known as power feeds, or, in short, feed) for supplying electromagnetic energy to the object 50. For example, radiating element 18 may include slot antennas. Alternatively, radiating element 18 may also include waveguides or antennas of any other kind or form, or any other suitable structure from which electromagnetic radiation may be emitted.

Power supply 12, modulator 14, amplifier 16, and radiating element 18 (or portions thereof) may each constitute discrete components separate from one another. Alternatively, any combination of these components may be integrated together into a single component. For example, a magnetron may be used as power supply 12 to generate electromagnetic energy, and a radiating element 18, such as a waveguide, for example, may be physically attached to the magnetron for supplying the electromagnetic energy to energy application zone 20 via electromagnetic radiation transmitted therein. Alternatively, radiating element 18 may be separate from the magnetron. Similarly, other types of electromagnetic generators may be used where radiating element 18 is either physically separate from or part of power supply 12.

In some embodiments, more than one radiating element 18 may be provided. These radiating elements may be located on one or more surfaces associated with energy application zone 20. Alternatively, or additionally, one or more of radiating elements 18 may be located inside and/or outside the energy application zone. Radiating elements 18 located outside of energy application zone 20 may be coupled to elements that would allow the radiated energy to reach the energy application zone. The orientation and configuration of each radiating element may be distinct or the same, based on the specific energy application. Furthermore, the location, orientation, and configuration of each radiating element 18 may be predetermined before supplying energy to object 50, or dynamically adjusted using a processor while supplying energy.

In addition to or instead of transmitting electromagnetic energy, radiating element 18 may be configured to receive electromagnetic energy. That is, radiating element 18 may include any structure from which electromagnetic energy may radiate and/or be received, regardless of whether the structure was originally designed for the purposes of radiating or receiving energy, and regardless of whether the structure serves any additional function.

In some embodiments, as shown in FIG. 1, at least one detector 40 may be coupled to one or more of radiating elements 18 that, when functioning as receivers, receive electromagnetic waves from energy application zone 20.

Detector 40 may be configured to detect signals associated with electromagnetic waves received by the one or more radiating elements 18.

Detector 40 may include an electric circuit that measures one or more parameters associated with electromagnetic waves. For example, detector 40 may include a power meter configured to detect a level of the power associated with an incident, reflected and/or transmitted electromagnetic wave. Detector 40 may also include an amplitude detector configured to detect an amplitude of the wave, a phase detector configured to detect a phase of the wave, a frequency detector configured to detect a frequency of the wave, and/or any other circuit suitable for detecting a characteristic of an electromagnetic wave. In operation, incident power may be supplied by power supply 12 to a radiating element 18 functioning as a transmitter. Modulator 14 and/or amplifier 16 may be operated as well in order to provide incident power to radiating element 18. As a result, electromagnetic radiation may be transmitted into the energy application zone 20 by the transmitter as a portion of the incident power. Of the incident power, a portion may be dissipated by object 50 or other aspects associated with a load in energy application zone 20. The amount of power dissipated by the load may be referred to as dissipated power. Another portion of the incident power may constitute reflected power. Reflected power may include, for example, power reflected back to the transmitter via the object and/or the energy application zone. Reflected power may also include power retained by the port of the transmitter (e.g., power that is emitted by the antenna but does not flow into the zone). The rest of the incident power, other than the reflected power and dissipated power, may be transmitted to the one or more radiating elements 18 functioning as receivers in the form of transmitted power.

Detector 40 may also include suitable types of circuits or devices that measure the voltage and current at the ports of radiating elements 18. In some embodiments, detector 40 may include a directional coupler, configured to allow signals to flow from the amplifier to the radiating elements when the radiating elements function as transmitters, and to allow signals to flow from the radiating elements to the detector when the radiating elements function as receivers. Additionally, the directional coupler may be further configured to measure the power of a flowing signal.

Returning to FIG. 1, electromagnetic energy transfer device 10 may also include at least one processor 30. Processor 30 may include any suitable electric circuit configured to execute one or more instructions. For example, processor 30 may include one or more integrated circuits, microchips, microcontrollers, microprocessors, all or part of a central processing unit (CPU), graphics processing unit (GPU), digital signal processors (DSP), field-programmable gate array (FPGA), or other circuit suitable for executing instructions or performing logic operations.

The instructions executed by processor 30 may, for example, be pre-loaded into the processor or may be stored in a separate memory unit (not shown) such as a RAM, a ROM, a hard disk, an optical disk, a magnetic medium, a flash memory, other permanent, fixed, or volatile memory, or any other mechanism capable of storing instructions for access by processor 30. Processor 30 may be customized for a particular use or can be configured for general-purpose use and perform different functions by executing different software.

Processor 30 may include one or more processor devices. If more than one processor is employed, all may be of a similar type, or one or more could be of a different type. Additionally, any of the processors can be electrically coupled together or, alternatively, electrically isolated from one another. Multiple processors can be integrated together in a single circuit. When more than one processor is used, they may be configured to operate independently or collaboratively. Further, they may be coupled electrically, magnetically, optically, acoustically, mechanically, wirelessly or in any other way permitting at least one signal to be communicated between them.

In some embodiments, processor 30 may be configured to regulate the source of electromagnetic energy in order to supply RF energy to energy application zone 20. Processor 30 can also be configured to provide other functions, such as controlling one or more components or devices other than the source of electromagnetic energy.

Processor 30 may be further configured to determine a value indicative of a rate of energy absorption by a load, in energy application zone 20, including at least a portion of object 50. In some embodiments, this determination may be made during a first period of time occurring before transferring to object 50 electromagnetic energy configured to process object 50. In other embodiments, this determination may be made during a first period of time coincident with at least a portion of the time during which object 50 is processed by incident electromagnetic energy.

The first period of time may have any length suitable for allowing processor 30 to determine a value indicative of a rate of energy absorption by a load. In some embodiments, the first period of time may have a length between about 1 millisecond and about 30 seconds such as, for example, 1, 5, 10, or 30 seconds. In some embodiments, the first period of time may have a length shorter than about 0.5 seconds.

In some embodiments, electromagnetic energy transfer device 10 may be configured to perform a sweep over one or more parameters associated with the electromagnetic radiation transmitted to energy application zone 20. For example, to perform a sweep, processor 30 may determine initial and final values of frequency, phase, amplitude, and/or any other parameter associated with the electromagnetic waves transmitted to energy application zone 20 in order to define a range for any of these parameters. To perform a sweep, processor 30 may control the source of electromagnetic energy such that radiation transmitted to energy application zone 20 varies over the selected range of parameter values between the initial and final values for any of the parameters to be varied.

In some embodiments, a collection of all possible values of the variable parameters may be referred to as a "modulation space" (MS), and a set of specific values of the variable parameters may be referred to as a modulation space element (MSE). Two MSEs may differ one from another if for at least one of the variable parameters defining the MSEs, the two MSEs have different values. For example, a first MSE may include energy transmissions from two feeds, and exhibit a first amplitude difference between these energy transmissions, and a second MSE may include energy transmissions from the same two feeds, and exhibit a second, different from the first, amplitude difference between the energy transmissions. In another example, one MSE may have a specific frequency $F(i)$ transmitted by all the feeds, a specific phase $\varphi(i)$ between two of the feeds, and a specific amplitude difference $A(i)$ between two of the feeds. If even one of these MSE variables change, then the new set defines another MSE. For example, (3 GHz, 30°, 12 V) and (3 GHz, 60°, 12 V) are two different MSEs, although only the phase component changes. Therefore, in some embodiments, the value indicative of a rate of energy absorption by the load may be determined over a range of MSE values. In one exemplary embodiment, processor 30 may be configured to perform a sweep by varying the frequency of the radiation transmitted to zone 20 over any number of different frequency values between and including initial and final frequency values that define a range of frequencies. In some exemplary embodiments, processor 30 may be configured to perform a sweep by varying the frequency, phase, amplitude, and/or any other variable parameter of the radiation transmitted to zone 20 over any number of different values between and including initial and final values that define a range of variables. A sweep over all the variables, each between an initial and final value may form a sweep over the modulation space.

The period of one sweep may refer to a length of time taken by processor 30 to vary any appropriate parameter(s) of the electromagnetic radiation over one complete cycle starting with an initial set of values of parameters and ending with a final set of values of parameters, for instance, between a first set of frequency, phase, and amplitude, and a second set of frequency, phase, and amplitude. The first period of time during which processor 30 determines a value indicative of a rate of energy absorption by a load may be related to the period of one or more sweeps. For example, the first period of time may be selected such that its length is equal to the period of one sweep. Alternatively, the first period of time may be selected such that its length is substantially equal to multiple sweep periods.

The first period of time may also be tied to other operational aspects associated with electromagnetic energy transfer device 10. For example, in some embodiments, object 50 may move in energy application zone 20. The value indicative of the rate of energy absorption by the load may comprise a time-averaged value determined, at least in part, based on measurements acquired as the object moves, and the first period of time may be selected to include any amount of time suitable for enabling determination of such time-averaged values. In some embodiments, for example, object 50 may rotate within energy application zone 20, and the first period of time may have a length equal to at least one period of rotation for object 50. In some embodiments, the first period of time may be shorter than one period of rotation, for example, when body 50 is symmetrical. For instance, if body 50 is elongated (like a hot dog), half period of rotation may be sufficient.

During the first period of time, the power of the source of electromagnetic energy (e.g., the source power) may be set at a certain value between zero and a maximum available power. The maximum available power may be the highest power level that the source is capable of providing. At different MSEs, a source may have different maximum available power levels. In some embodiments, the source power in the first period of time may be set at a level equal to or lower than the source power during the actual processing time, e.g. during cooking. In some embodiments, the source power in the first period of time may be set at a level not significantly changing the properties of object 50.

The value indicative of the rate of energy absorption may not necessarily be the actual energy absorption rate of the load in the energy application zone. Any value that is capable of directly or indirectly indicating the rate of energy absorption by the load may be used as the value indicative of the rate of energy absorption. Without being bound by the theory, there may be various ways to consume the RF energy supplied by the source in addition to being absorbed by the object. For example, in addition to energy absorbed by object 50, a portion of the RF energy may also be absorbed by structures associated with energy application zone 20 or by residue left on the surfaces of energy application zone 20. Thus, in certain embodiments, the object may contribute to at least a portion of the load. Additionally, a portion of the RF energy may leak out of energy application zone 20 without being absorbed. In some embodiments, such absorption by structures associated with energy application zone 20, absorption by residue, and/or leakage may constitute a loss of RF energy of up to about 100 W even when the cavity is empty.

The value indicative of the rate of energy absorption by the load may be determined by any suitable method. In some embodiments, this value may be determined based on an amount of power reflected by the load, which may be indicative of the rate of energy absorption by the load. For example, for a particular incident power level, increasing levels of power reflected by the load may indicate decreasing levels of power absorbed by the load. Thus, by monitoring an amount of reflected power using, for example, detector 40 connected to radiating element 18, a value indicative of the rate of energy absorption by the load may be determined. Particularly, as discussed earlier, from the incident power supplied by power supply 12, a portion may be dissipated by the load, a portion may be reflected back to (or retained by) radiating elements 18 acting as transmitters, and a portion may be transmitted to another one or more of radiating elements 18 acting as receivers. By subtracting the reflected power and the transmitted power from the incident power, a power dissipated by the load, which may be indicative of the rate of energy absorption by the load, may be determined.

The value indicative of the rate of energy absorption by the load may be determined for one unique set of operational parameters (e.g., frequency, phase, amplitude, power level, etc.) associated with energy transfer device 10. Alternatively, or additionally, this value may be determined over any range of operational parameters. In one exemplary embodiment, the source of electromagnetic energy may be configured to supply RF energy over a range of frequencies, phase values, power levels, etc. The value indicative of the rate of energy absorption by the load may be determined over a range of any of these values. For example, operational parameters may be swept, and the value indicative of the rate of energy absorption by the load may be determined for each unique set of operational parameters included in the sweep. Additionally, the values indicative of the rate of energy absorption may be summed over all the operational parameters included in the sweep, and an average of the value indicative of the rate of energy absorption may be obtained. In some embodiments, such average may be used as a value indicative of the rate of energy absorption by the load.

Based on the value indicative of the rate of energy absorption by the load, processor 30 may be configured to determine a predicted amount of time that may be needed to obtain a desired characteristic in at least a portion of object 50. For example, object 50 may include any material susceptible to processing using RF energy. In some instances, such processing affects one or more characteristics associated with the material. For example, absorption of RF energy may cause a change in temperature, a phase change, melting, sintering, drying, thawing, etc. within at least a part of object 50. Such processing may be performed in order to achieve one or more desired characteristics associated with object 50, for example, to achieve a predetermined level of sintering or melting for at least a portion of object 50. The RF energy treatment process may be deemed complete when one or more of the desired characteristics have been provided in object 50. In one exemplary embodiment, object 50 includes a food item, and the desired characteristic may include a desired final cooking state for the food item. For some types of food (e.g., meat and eggs), the desired final cooking state may coincide with a desired temperature for the food. In other types of food (e.g., vegetables), the desired final cooking state may coincide with a desired level of resiliency. For a certain amount and type of material susceptible to processing using RF energy, whether a food item or otherwise, processor 30 may be configured to determine a predicted amount of time needed to obtain a desired characteristic (e.g., a predetermined final temperature, a predetermined level of resiliency, a predetermined level of sintering, a predetermined level of melting, etc.) in the material. A level of melting of metal powder, for instance, may be defined as the volume ratio between metallic powder and liquid metal.

As used herein, the term predetermined may indicate that the associated quantity or value is calculated or otherwise determined before processing is completed. Predetermined values may include values stored in memory; values calculated, observed, measured, read into, received, etc. before commencement of electromagnetic energy processing; or any values calculated, observed, measured, read into, received, etc. during such processing.

In some exemplary embodiments of the present invention, at least one object made from a pre-sintered and pressed powder, also known as green body, is placed in the energy application zone, for example, in an RF sintering furnace. Examples of green body comprise powders of metal, metal oxide, and metal carbide. Optionally, a protective atmosphere may be applied to the energy application zone during heating. RF energy may be transferred to the energy application zone in a plurality of MSE's in order to heat and sinter the object. The level of sintering may be defined as the density of the sintered object, measured, for instance, in $gm/cm^3$. As the object is being sintered and the density increases, the energy absorption rate of the object changes. These changes may be detected for a certain period of time. Processor 30 may be configured to determine, based on the detected changes, an amount of time or an amount of energy needed to heat the object to obtain a predetermined level of density.

In some embodiments, it is desired to avoid melting of the green body during the sintering process to obtain a sintered body of less than maximal density. In some embodiments, processor 30 may be configured to predict, based on changes in the energy absorption rate or other detected parameters during a first period of heating, an amount of time or an amount of energy that may cause the object to be sintered to a predetermined degree, for example without melting the powder.

In some embodiments, the object or objects to be sintered may be MMC (Metal Matrix Composite), made of a mixture of metallic and ceramic powders, such as cobalt and tungsten-carbide (also known as cemented-carbide). The desired characteristic may be defined as a predetermined level of melting of the metallic powder in the composite. Processor 30 may be configured to predict an amount of time or an amount of energy expected to cause the object to sinter while melting the metallic powder to a predetermined level of melting.

In some embodiments, the predicted amount of time may be determined based on two quantities: e.g., the value indicative of the rate of energy absorption by the load and a value indicative of a total amount of energy to deliver to the load in order to achieve the desired characteristic in the material. In some embodiments, the predicted amount of time may be determined based on additional quantities, for example, available power levels, etc. As discussed above, the value indicative of the rate of energy absorption by the load may be determined by measuring an amount of power dissipated in the load, at least a portion of which including object 50. The amount of power dissipated may be determined as a dissipation ratio (e.g., a ratio of power dissipated in the load and total incident power) for one set of characteristics (e.g., frequency, phase, power level, amplitude, etc.) of the radiation transmitted to energy application zone 20. Alternatively, or additionally, the amount of power dissipated may be determined as a dissipation ratio for multiple sets of characteristics of the radiation transmitted to energy application zone 20 (e.g., over ranges of frequencies, phase, amplitude, power level, etc.).

The value indicative of a total amount of energy to deliver to the load in order to achieve the desired characteristic in the material may be determined in a number of ways. For example, in some embodiments, electromagnetic energy transfer device 10 may directly receive a specification of the total amount of energy to deliver to the load. Such a specification may be provided to energy transfer device 10 by a user that conveys this information via a man-machine user interface device. Alternatively, or additionally, energy transfer device 10 may receive this information by reading information stored in a memory (either onboard or remotely located from device 10), a barcode, RFID tag, optical indicia, or any other type of machine readable element or memory.

Alternatively, or in combination with the methods above, processor 30 may be configured to determine the value indicative of a total amount of energy to deliver to the load based on one or more values associated with the material and/or the desired characteristic of the material. For example, based on one or more quantities such as a type indicator associated with the material to be processed, an amount of the material, an energy transfer coefficient associated with the material (which may be the same or different from a known heat capacity for the material), etc., processor 30 may be configured to calculate the total amount of energy to deliver to the load. Processor 30 may also be configured to base the total amount of energy calculation upon other factors such as, for example, an initial temperature associated with at least a portion of object 50 and a desired final temperature for at least a portion of object 50.

Each material to be processed may exhibit a unique energy transfer coefficient based at least in part on material type and interaction characteristics between the material of object 50 and energy transfer device 10. In some embodiments, the energy transfer coefficient may have a value indicative of the amount of energy needed to increase the temperature of one unit weight of the object by one unit temperature. For example, the energy transfer coefficient may be a value indicative of how many kilojoules of energy are needed to increase the temperature of one kilogram of the object by one degree Celsius.

The energy transfer coefficient may have the same units as heat capacitance. For example, in some embodiments, the heat capacitance of a material associated with object 50 may be used as the energy transfer coefficient. In other embodiments, however, the energy transfer coefficient may be different from the heat capacitance of the material associated with object 50 and may incorporate energy transfer characteristics of energy transfer device 10. Such a device-specific energy transfer coefficient may take into consideration device-specific properties that may affect the rate of energy uptake by a material associated with object 50. For example, such an energy transfer coefficient may account for energy losses in a specific energy application zone 20, and, thus, may be more suitable than heat capacity alone for the prediction of the amount of time needed for heating a load to a certain degree. The device-specific energy transfer coefficient may be larger than the heat capacitance of the load. For example, the heat capacitance of beef is between about 2.34 and about 3.18 kJ/(kg·° C.) depending on the specific portion of the beef. In some RF energy transfer devices, however, useful energy transfer coefficients for beef may be about 7.5 kJ/(kg·° C.).

The predicted amount of time for achieving a desired characteristic may be determined by applying any suitable algorithm to the value indicative of energy absorption by the load and the value indicative of the total amount of energy to deliver to the load. For example, in some embodiments, the predicted amount of time may be obtained by dividing the total amount of energy to deliver to the load by the value indicative of the rate of energy absorption by the load. As an exemplary illustration, if the total amount of energy required to obtain a desired characteristic in object 50 is 32 kJ and the value indicative of the rate of energy absorption by the load, including object 50, is 100 W (i.e. 0.1 kJ per second) of absorbed power, then 320 sec will be required to obtain the desired characteristic (i.e., 32 kJ/100 W=320 sec).

In some embodiments, processor 30 may be configured to determine the predicted amount of time by multiplying the value indicative of the total amount of energy to deliver to the load by a predetermined factor (e.g., a calibration factor, efficiency factor, or other type of offset factor) before dividing the result by the value indicative of the rate of energy absorption by the load. In some embodiments, the predetermined factor may be at least 1.0. For example, the predetermined factor may be 1.1.

As a further illustration of at least one disclosed embodiment, the amount of energy needed to achieve a predetermined desired characteristic of object 50 (e.g., a final cooked state associated with a predetermined final temperature value, among others) may be determined based on an initial temperature associated with object 50, a mass associated with object 50, and the energy transfer coefficient associated with object 50. The predicted amount of time may then be determined based on the amount of energy needed to achieve the predetermined desired characteristic of object 50 and the value indicative of the rate of energy absorption by the load, for example, by dividing the amount of energy needed to achieve the predetermined desired characteristic of object 50 by the value indicative of the rate of energy absorption by the load.

The predicted amount of time may include multiple components. For example, the predicted amount of time may include a component corresponding to a "temperature rise time" during which a temperature of object 50 rises as a result of electromagnetic energy absorption. Additionally, or alternatively, the predicted amount of time may include a component corresponding to an amount of time during which a material associated with object 50 stays at a constant temperature, for example, due to a phase change (e.g., a change in a state of matter, for example, from solid to liquid).

The predicted amount of time may also include any other appropriate periods of time for achieving a desired result. For example, in certain embodiments, the predicted amount of time may include a period of time during which the temperature of object 50 is to be maintained at a predetermined level. As an illustrative example, the resiliency of vegetables being cooked may depend both on the temperature of the vegetables and on an amount of time that the vegetables are maintained at a certain temperature level. To achieve a desired level of resiliency in cooked vegetables, it may be necessary to raise the temperature of the vegetables to a predetermined temperature and then maintain that temperature for a certain period of time, e.g., to process complex hydrocarbons, such as starch, included in the vegetables.

In the case of vegetables, the energy transfer coefficient may be expressed in terms of the amount of energy required to raise a certain quantity of the vegetable by one degree Celsius. In such an embodiment, the predicted amount of time to achieve the desired level of resiliency may include a period of time during which the temperature of the vegetables is rising and another period of time during which the temperature of the vegetable is maintained at a substantially constant temperature.

In some exemplary embodiments, maintaining the temperature of the vegetable (or of any other object) at a substantially constant value is achieved by supplying less heat than was supplied in the energy rise stage. Optionally, the supplied heat is sufficient only to compensate for cooling of the heated object, such that the object maintains constant temperature. Alternatively or additionally, energy may be applied intermittently. For example, the energy may be put on if the temperature drops below a lower threshold, and put off if the temperature rises above a higher threshold.

In certain embodiments, it may be useful to express the energy transfer coefficient in terms more general than effective heat capacitance discussed above. For example, where achieving a desired characteristic in a material associated with object 50 requires an energy transfer process comprising multiple phases, the energy transfer coefficient may be expressed as an amount of energy needed to achieve the desired characteristic in a certain amount of the material. To illustrate this principle further, in the case of cooking vegetables, the energy transfer coefficient may be expressed as a value indicative of the amount of energy needed to render one unit weight of the object ready to eat (i.e., having a desired level of resiliency/softness). In this way, processor 30 may calculate the predicted amount of time for processing without having to separately take into account various different time periods that may be associated with specific processing steps for the material of object 50.

Values for the parameters used by processor 30 in determining the predicted amount of time for processing (e.g., temperature of object 50, mass of object 50, material type, energy transfer coefficient, etc.) may be determined in a variety of ways. In some embodiments, one or more of these values may be provided to processor 30 by a user of the energy transfer device 10. For example, the user may input information relating to object 50 or desired processing conditions via a user interface device, which may be configured to transfer the inputted information to processor 30. Alternatively, or additionally, values for these parameters can be read from various machine readable elements (e.g., barcodes, RFID tags, optical indicia, etc.). Further, values for these parameters may be determined in-situ through the use of one or more sensors. For example, in some embodiments, energy transfer device 10 may further include one or more temperature sensors and/or weight sensors. In such embodiments, processer 30 may be configured to determine a temperature associated with the object (e.g., initial temperature and/or temperature during processing) based on an output of the temperature sensor. Similarly, a mass associated with object 50 may be determined based on an output of a weight sensor. Other types of sensors may be used with energy transfer device 10 based on the requirements of a particular application.

Figure 2:
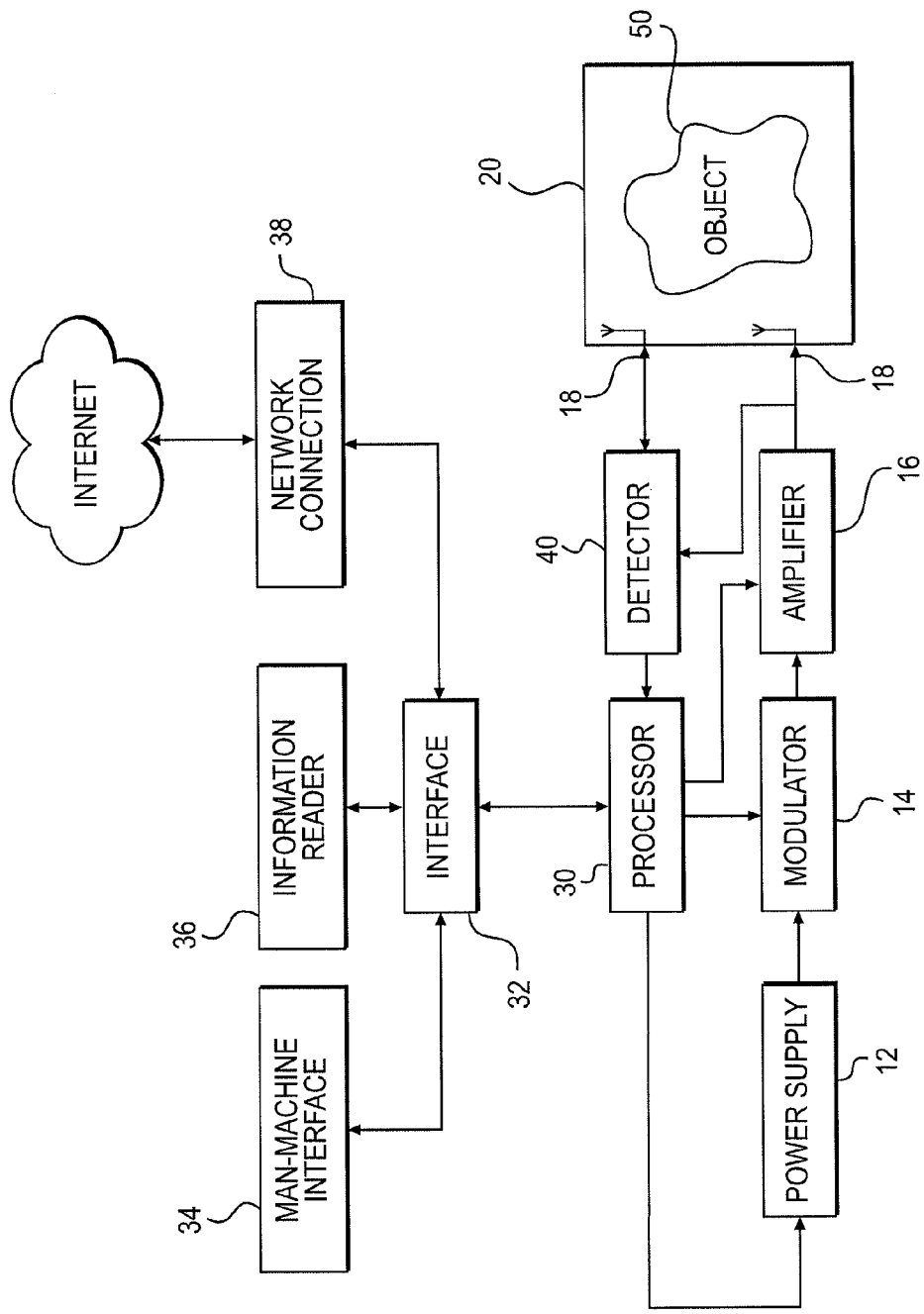
FIG. 2 is a diagrammatic representation of a device for applying electromagnetic energy to an object, in accordance with an exemplary disclosed embodiment.

To facilitate information transfer to and from processor 30, some embodiments may include an interface 32, as shown in FIG. 2. Interface 32 may provide a conduit for information transfer to and from processor 30 and may include any circuitry, components, or devices suitable for transferring signals between processor 30 and one or more information sources. In some embodiments, interface 32 may include a data bus for carrying signals to and from processor 30.

The information sources in communication with processor 30 via interface 32 may include any suitable devices for providing signals to processor 30. In some embodiments, interface 32 may be configured to transfer signals to or receive signals from a man-machine interface 34. Man-machine interface 34 may include any suitable type of input device for receiving input from a user of energy transfer device 10. In some embodiments, man-machine interface 34 may include a graphical user interface. Alternatively, or additionally, man-machine interface 34 may include any combination of a plurality of buttons, a touch screen, microphone, pointer device, etc. useful for inputting information. Through man-machine interface 34, a user may input one or more values associated with object 50, with a desired characteristic, and/or with a desired procedure for processing object 50. For example, using man-machine interface 34, the user may provide an initial temperature, a mass value, a desired final temperature, a desired final characteristic, a desired final cooking state, a total amount of energy to deliver, or any other value associated with object 50, a characteristic that object 50 should have as a result of the processing, and/or the procedure for processing object 50 with electromagnetic energy.

Interface 32 may also be configured to transfer signals to or receive signals from a network connection 38. Network connection 38 may be used to connect the energy transfer device 10 with one or more sources of information located external to energy transfer device 10. For example, network connection 38 may provide a communication path to one or more remotely located computers, to the Internet, to an externally located database, etc. In some embodiments, network connection 38 may enable one or more remotely located users or devices to input parameter values, run programs, and/or enter commands for operation of energy transfer device 10. The connection between interface 32 and network connection 38 may be established using any appropriate communication hardware and communication protocols. For example, in some embodiments, network connection 38 may include a router and/or other appropriate hardware, and interface 32 and network connection 38 may be in communication across either a wired or wireless connection.

Interface 32 may also be configured to communicate with one or more information readers 36, which, in turn, may be adapted to read or receive information associated with a machine readable element. For example, in some embodiments, the machine readable element may include one or more of an RFID tag, a barcode, optical images or indicia, and/or combinations thereof. In certain embodiments, the machine readable element may be attached, affixed, or otherwise associated with object 50 or its packaging. The machine readable element may include encoded information relating to object 50 and/or relating to a procedure for processing object 50. For example, information stored on the machine readable element may include, e.g., a material type indicator, a weight associated with object 50, an energy transfer coefficient related to object 50, a total amount of energy to deliver to object 50, and/or any desired characteristic of object 50 to be achieved through processing with electromagnetic energy. Object 50 may include a plurality of associated machine readable elements, each of which may identify different desired characteristics of the object. For example, each machine readable element may include a unique set of instructions corresponding to different options for processing object 50. Before loading object in energy application zone 20, a user may remove or disable any machine readable elements other than the machine readable element that corresponds to the desired procedure for processing object 50. In one exemplary embodiment, for example, object 50 may include a meat item, and several machine readable elements may be associated with the meat item, each corresponding to a different, desired final temperature for the meat (e.g., rare, medium, well-done, etc.). Prior to processing the meat item, a user may select the machine readable element corresponding to the desired temperature for the meat (e.g., by removing or disabling the machine readable elements other than the one corresponding to the process for generating the desired temperature in the meat). Alternatively, or additionally, a user may manually operate information reader 36 and scan a selected machine readable element corresponding to the desired procedure for processing object 50. Further still, processor 30 may be configured to control information reader 36 in such a manner that an appropriate machine readable element is automatically selected for reading based, for example, on user input provided through man-machine interface 34.

In some embodiments, interface 32 may be connected to external measuring devices (not shown) for measuring one or more quantities associated with object 50. For example, suitable external measuring devices may include an external temperature sensor, an external scale, etc. Such devices may, for example, provide an initial temperature and/or weight associated with object 50 prior to placing object 50 in energy application zone 20. The observed values for initial temperature and weight of object 50 may be transferred to processor 30 via interface 32.

Energy transfer device 10 may also include a display unit, which may be used, for example, to display information to a user. For example, processor 30 may provide to the display unit various types of information, such as the predicted amount of time to obtain a desired characteristic in object 50, a total elapsed time of electromagnetic energy processing, and/or an amount of time remaining in an energy transfer process. The display unit may also be used to prompt the user to input parameters or commands, or to alert the user that the predicted amount of time has elapsed (e.g., that a desired cooking process has finished).

As indicated, processor 30 may be configured to regulate the source of electromagnetic energy in order to control how electromagnetic energy is supplied to energy application zone 20. In some embodiments, processor 30 may 30 be able to control characteristics of the electromagnetic radiation transmitted to energy application zone 20. Additionally, processor 30 may, in some embodiments, be configured to control a length of time during which electromagnetic radiation is transmitted to energy application zone 20. For example, as discussed above, processor 30 may be configured to determine a predicted amount of time to achieve a desired characteristic in at least a portion of object 50 through processing with electromagnetic energy. Processor 30 may use the predicted amount of time as an actual time for processing object 50 with electromagnetic radiation. In some embodiments, processor 30 may cause the source of electromagnetic energy to stop the supply of electromagnetic energy to energy application zone 20 once the predicted amount of time has elapsed.

The predicted amount of time for processing object 50 may have a predetermined relationship to the length of time during which the value indicative of a rate of energy absorption by the load may be determined. This relationship may be selected such that any desired ratio exists between the predicted processing time (Tp) and the time (Ta) for determining the absorption characteristics of the load. For example, the ratio Tp/Ta may include any desired value greater than 1. In some embodiments, however, it may be desirable to select a time duration for Ta that is significantly shorter than Tp and results in a Tp/Ta ratio much greater than 1. For example, Tp may be greater than Ta by a factor of between 15 and 1000. In other embodiments, Tp may be greater than Ta by a factor of between 15,000 and 150,000.

After the predicted amount of time has elapsed, processor 30 may issue one or more prompts to the user, for example, via man-machine interface 34. These prompts may include various queries, such as asking the user whether to terminate processing (e.g., cooking) or whether the user wishes to commence another processing (e.g., cooking) stage. For example, in one exemplary embodiment, object 50 may include bread or bread dough, and the user prompts may indicate to the user that the bread has finished rising, and it is time to start browning. In another exemplary embodiment, object 50 may include a meat item, and the user prompts may include informing the user that the meat has reached a temperature corresponding to rare, medium rare, medium, etc. and asking the user whether to further cook the meat to a higher temperature (e.g., well done). If the user selects further processing or cooking, processor 30 may update the predicted amount of time to achieve the final desired characteristic in object 50 (e.g., the newly selected final cooking temperature or state) and may update the user of the additional amount of time needed to process object 50. Processor 30 may issue various other prompts (e.g., a prompt to take an action of adding an ingredient, stirring, turning, inverting, etc.) to a user of energy transfer device 10, based on the requirements of a particular application.

EXAMPLES

Tables 1 and 2 illustrate exemplary methods for determining the predicted amount of time needed to complete processing (e.g., cooking) for 200 g of steak and 6 whole eggs, respectively. In the tables, "Rule C" represents an exemplary energy transfer coefficient. "Oven temperature" indicates the air temperature in the oven. The oven temperature may or may not have an effect on the energy transfer coefficient.

TABLE 1

| Steak (200 g) | | | |
| --- | --- | --- | --- |
| | | Medium | Well |
| Mass, M | g | 200 | 200 |
| Oven temperature | ° C. | 250 | 250 |
| Initial inside temperature | ° C. | 8 | 8 |
| Final inside temperature | ° C. | 55 | 65 |
| Rule C= | kJ/(100 g · ° C.) | 0.75 | 0.75 |
| Desired Energy, Q | kJ | 70.5 | 85.5 |
| Measured Energy Absorption Rate, P | kW | 0.340 | 0.340 |
| Predicted Cooking Time, Q/P | sec | 207 | 251 |
| Actual Cooking Time | sec | 206 | 251 |

TABLE 2

| Whole eggs (6) | | | |
| --- | --- | --- | --- |
| Mass, M | g | 400 | 400 |
| Oven temperature | ° C. | 80 | 80 |
| Initial inside temperature | ° C. | 20 | 20 |
| Final inside temperature | ° C. | 62 | 72.5 |
| Rule C= | kJ/(100 g · ° C.) | 0.75 | 0.75 |
| Desired Energy, Q | kJ | 126 | 157.5 |
| Measured Energy Absorption Rate, P | kW | 0.375 | 0.375 |
| Predicted Cooking Time, Q/P | sec | 336 | 420 |
| Actual Cooking Time | sec | 360 | 418 |

In Table 1, "medium" and "well" describe the target final cooking states of the steak. As illustrated in Table 1, 70.5 kJ represents the total amount of energy to deliver to 200 g of steak to reach a medium cooked state. Based on a measured energy absorption rate at the load of 0.34 kW, the total predicted cooking time needed to reach the medium cooked state was 207 sec, which closely matched the experimentally observed value of 206 sec. Similar results were obtained for cooking the steak to a well done state and in cooking eggs.

Tables 3 and 4 illustrate exemplary methods for determining the predicted amount of time needed to complete processing (e.g., cooking) for vegetables, including, e.g., whole potatoes and broccoli in plastic box without water. As shown in Table 3, based on the energy Q needed to cook the potatoes to the desire final state and based on the measured power absorption rate, the predicted amount of time for cooking 450 g of potatoes was 1216 seconds, which closely matched the actual measured cooking time of 1209 seconds. Similar results were achieved with 285 g of potatoes. As shown, there is a difference between the power absorbed by 450 g of potatoes and that absorbed by 285 g of potatoes, although in both cases, the same oven and power level were used. Without being bound by the theory, the inventors have consistently observed that more massive loads tend to absorb energy at a rate greater than less massive loads.

TABLE 3

| Whole Potatoes | | | |
| --- | --- | --- | --- |
| Mass, M | g | 450 | 285 |
| Oven temperature | ° C. | 100 | 100 |
| Initial inside temperature | ° C. | 20 | 20 |
| Final inside temperature | ° C. | 100 | 100 |
| Rule C= | kJ/100 g | 100 | 100 |
| Desired Energy, Q | kJ | 450 | 285 |
| Measured Energy Absorption Rate, P | kW | 0.370 | 0.320 |
| Predicted Cooking Time, Q/P | sec | 1216 | 891 |
| Actual Cooking Time | sec | 1209 | 876 |

TABLE 4

| Broccoli in plastic box (no water added) | | |
|---|---|---|
| Mass, M | g | 160 |
| Oven temperature | ° C. | 100 |
| Initial inside temperature | ° C. | 20 |
| Final inside temperature | ° C. | ~75 |
| Rule C= | kJ/100 g | 100 |
| Desired Energy, Q | kJ | 160 |
| Measured Energy Absorption Rate, P | kW | 0.420 |
| Predicted Cooking Time, Q/P | sec | 381 |
| Actual Cooking Time | sec | 367 |

Figure 3:
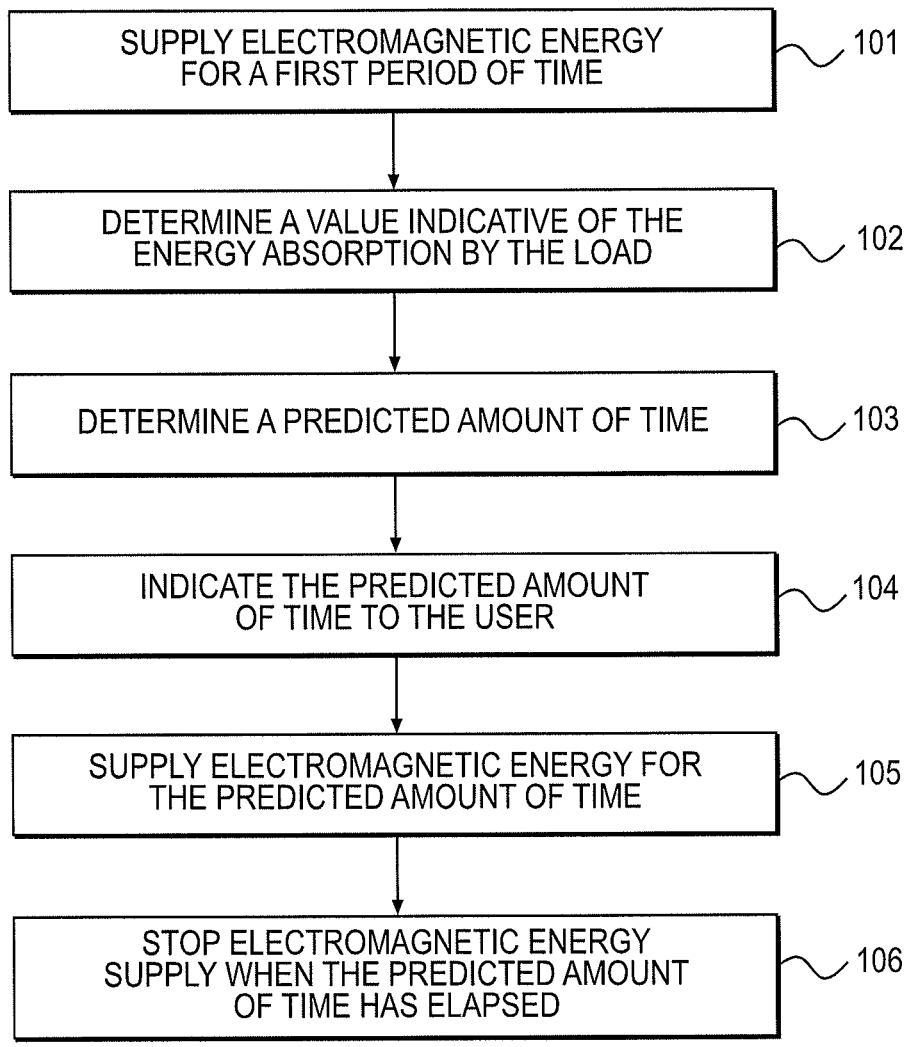
FIG. 3 is a flowchart representing method steps, according to an exemplary disclosed embodiment.

Some embodiments of the invention may include a method of processing an object using electromagnetic energy, as represented in FIG. 3. Particularly, at step 101, electromagnetic energy may be supplied to an energy application zone for a first period of time. At step 102, a value indicative of a rate of energy absorption by the load during this first period of time may be determined. At step 103, a predicted amount of time to obtain a desired characteristic in the object may be determined based on the value indicative of the rate of energy absorption by the load, and, optionally, based on known characteristics of the object. At step 104, the predicted amount of time may be indicated to a user, for example, by displaying on a display unit. At step 105, electromagnetic energy may be supplied to the object in the energy application zone for the predicted amount of time. Optionally, at step 106, the supplying of electromagnetic energy may be discontinued once the predicted amount of time has elapsed.

As discussed above, in certain embodiments, processor 30 may control the source to supply electromagnetic energy to energy application zone 20 for the predicted amount of time. In other embodiments, however, processor 30 may interact with the user such that processing (e.g., cooking) time may be adjusted according to the user's instruction. For example, a user of energy transfer device 10 may enter a desired cooking time via, for example, man-machine interface 34. Processor 30 may be configured to cause the source to supply electromagnetic energy to energy application zone 20 during a first period of time and determine a value indicative of a rate of energy absorption by a load comprising at least a portion of object 50. Based on the value indicative of the rate of energy absorption thus determined, processor 30 may determine a predicted amount of time to obtain a desired characteristic (e.g., a desired final cooking state) in at least a portion of the object. Using the maximum available power level available for the device as a basis for the predicted time calculation, processor 30 can determine a minimum time required to reach the desired cooking state.

Processor 30 may be further configured to compare the desired cooking time, entered by the user, with the calculated minimum cooking time. If the desired cooking time is longer than the minimum cooking time, processor 30 may control the source to supply electromagnetic energy to energy application zone 20 based on the desired cooking time, in accordance with the user's instruction. Cooking, or otherwise processing within a desired time period may be carried out according to one of several cooking modes. In some embodiments, a cooking mode to be used may be selected by the user, retrieved from memory, read from a machine readable element, etc. On the other hand, if the user's desired cooking time is shorter than the calculated minimum cooking time, processor 30 may alert the user and indicate that the desired cooking time is too short to achieve the desired cooking state. The alert may include, for example, an audible warning, a visual alert via one or more indicator lights, and/or an alert displayed on a display unit associated with energy transfer device 10. In some embodiments, the user may be prompted to input a new desired cooking time and/or to redefine the desired characteristic. In some embodiments, the oven may indicate to the user the minimal cooking time determined for the desired characteristic.

In some embodiments of the invention, a user may select a cooking mode from among a plurality of available cooking modes. Alternatively, or additionally, processor 30 may be configured to automatically select the cooking mode based on information received via interface 32. In some embodiments, the plurality of cooking modes may be pre-programmed and saved in a memory accessible by processor 30. Among others, the plurality of cooking modes may include a cook-then-wait mode, a wait-then-cook mode, a reduced-power mode, and/or a mode combining two or more of these modes. In the cook-then-wait mode, processor 30 may cause the source to supply electromagnetic energy to energy application zone 20 for a cooking period and then halt or diminish the supply of electromagnetic energy to energy application zone 20 for a waiting period. During the cooking period, the source may supply electromagnetic energy to energy application zone 20 at the maximum available power or at any other desired power level, lower than the maximum. In some embodiments, the cooking period may be approximately equal to the calculated minimum cooking time. In other embodiments, however, the cooking period may be longer or shorter than the calculated minimum cooking time. The sum of the cooking period and the waiting period may be approximately equal to the user-selected desired cooking time.

In some embodiments, cooking continues for a certain period even in the absence of a supply of energy. For example, the cooking process of a food item may continue after energy supply is halted, for example, until the food item cools to below a certain temperature. Thus, if cooking and waiting periods are combined, in some embodiments, the sum of energy supply periods may be shorter than the calculated minimum cooking time.

In some embodiments, the apparatus may be operated in the wait-then-cook mode, and processor 30 may cause the source to supply electromagnetic energy to energy application zone 20 only after a predetermined waiting period has elapsed. Once the waiting period ends, processor 30 may control the source to supply electromagnetic energy to energy application zone 20 at any desired power level within the limits of the maximal available power. In some embodiments, the electromagnetic energy may be supplied at the maximum available power such that the cooking period of the wait-then-cook mode may be approximately equal to the calculated minimum cooking time. The sum of the cooking period and the waiting period may be approximately equal to the user-selected desired cooking time.

In some embodiments, the apparatus may be operated in the reduced-power mode, and processor 30 may cause the source to supply electromagnetic energy to energy application zone 20 at a power lower than the maximum available power level. The power level may be determined such that the total required cooking time may be approximately equal to the desired cooking time. In this mode, the total required cooking time may be longer than the minimum cooking time at the maximum available power level. In some embodiments, other cooking modes may also be used. For example, another cooking mode may include one cooking period and two waiting periods. Processor 30 may implement a first waiting period prior to supplying electromagnetic energy for a predetermined cooking period, and then implement a second waiting period following the cooking period. As additional examples, a cooking mode may include two cooking periods and one waiting period, at least two cooking periods and at least two waiting periods, or any desired combination of cooking periods and waiting periods. During any of the cooking periods, processor 30 may control the source such that electromagnetic energy is supplied to energy application zone 20 at the maximum available power level or at any desired power level less than the maximum available level.

In some embodiments, processor 30 may be configured to prompt the user for input relating to a desired cooking mode. For example, if the user-selected desired cooking time is longer than the calculated minimum cooking time, processor 30 may prompt the user to enter or select a cooking period length in the range between the calculated minimum cooking time and the user-selected desired cooking time. Optionally, processor 30 may allow the user to instruct cooking for the desired cooking time, even though the processor predicts this cooking time would not suffice.

Based on the inputted or selected cooking period length, processor 30 may be further configured to adjust the power at which the source supplies electromagnetic energy to energy application zone 20. Alternatively, or additionally, processor 30 may be configured to prompt the user to input or select a percentage of the maximum available power at which the source supplies electromagnetic energy during the cooking period. For example, the percentage may be within a range between a value determined by dividing the calculated minimum cooking time by the desired cooking time and 100%. Processor 30 may be further configured to adjust the length of the cooking period based on the inputted or selected percentage of power.

Figure 4:
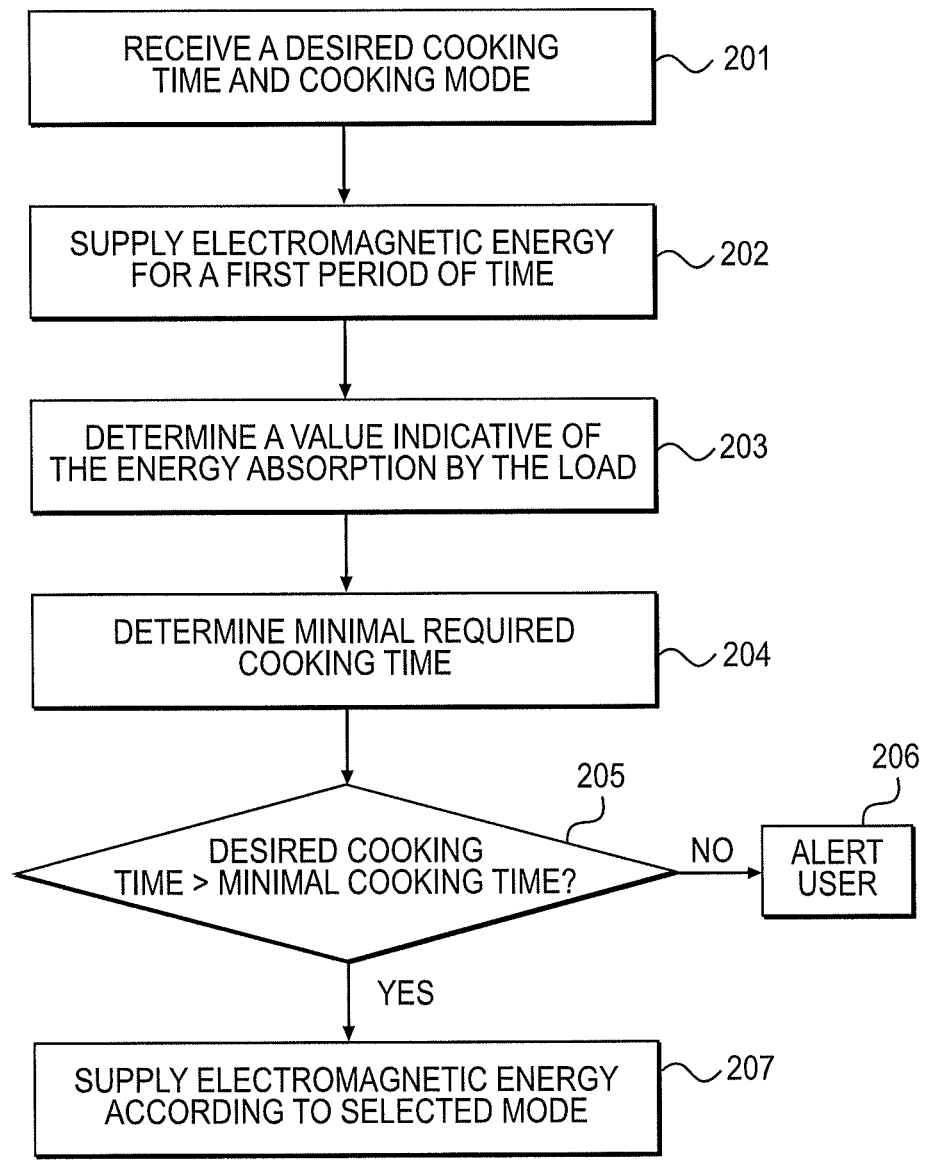
FIG. 4 is a flowchart representing method steps, according to another exemplary disclosed embodiment.

Consistent with embodiments of the invention, a method of cooking may comprise a series of steps, such as those described in FIG. 4. Referring to FIG. 4, at step 201, a desired cooking time may be received and a cooking mode may be selected, e.g., via interface 32 (FIG. 2). For example, a user may select via a GUI a desired cooking time and a cooking mode (e.g. cook-then-wait). At step 202, electromagnetic energy may be supplied to an energy application zone for a first period of time. At step 203, a value indicative of a rate of energy absorption by a load during the first period of time may be determined. At step 204, a minimum required cooking time to obtain a desired characteristic in the object may be determined based on the value indicative of the rate of energy absorption by the load and a maximum available power level. At step 205, the desired cooking time may be compared with the minimum cooking time to determine which one is longer. If the minimum cooking time is longer (step 205: NO), the process may proceed to step 206, at which an alert may be generated to alert the user that the inputted desired cooking time is not long enough to obtain the desired characteristic. On the other hand, if the desired cooking time is longer than the minimum cooking time (step 205: YES), the process may proceed to step 207, at which an electromagnetic energy may be supplied to the energy application zone in a manner according to the selected cooking mode.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Exemplary Embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. Thus, it is intended that the specification and examples be considered as exemplary only, with a true scope of the present disclosure being indicated by the following claims and their equivalents.

What is claimed is:

1. An apparatus for applying RF energy to an object in an energy application zone via a source of electromagnetic energy, comprising:
a source of electromagnetic energy including an amplifier;
an antenna;
a detector connected to the antenna; and
at least one processor configured to:
cause the source to supply RF energy to the energy application zone via the antenna;
determine a value indicative of a rate of energy absorption by a load, including at least a portion of the object, during a first period of time by monitoring via the detector an amount of reflected power reflected back to the antenna; and
determine, based on the value indicative of the rate of energy absorption by the load, an estimated amount of time to obtain a desired characteristic in at least a portion of the object.

2. The apparatus of claim 1, wherein the value indicative of the rate of energy absorption by the load is based on an amount of power transferred to the energy application zone.

3. The apparatus of claim 1, wherein the value indicative of the rate of energy absorption by the load is based on an amount of power dissipated in the load.

4. The apparatus of claim 1, wherein the value indicative of the rate of energy absorption by the load is determined over a range of modulation space element (MSE) values.

5. The apparatus of claim 1, wherein the object comprises a food item.

6. The apparatus of claim 1, wherein the desired characteristic includes a predetermined final temperature for at least a portion of the object.

7. The apparatus of claim 1, wherein the desired characteristic includes a predetermined level of resiliency for at least a portion of the object.

8. The apparatus of claim 1, wherein the desired characteristic includes a predetermined level of sintering for at least a portion of the object.

9. The apparatus of claim 1, wherein the desired characteristic includes a predetermined level of melting for at least a portion of the object.

10. The apparatus of claim 1, wherein the at least one processor is configured to cause the source to stop the supply of the RF energy to the energy application zone once the estimated amount of time has elapsed.

11. The apparatus of claim 1, further including an interface configured to receive one or more of a value indicative of a total amount of energy to deliver to the load, a value associated with the desired characteristic, a type indicator associated with the object, an energy transfer coefficient associated with the object, a mass associated with the object, or any combination thereof, and wherein the at least one processor is configured to determine the estimated amount of time based on the at least one value received via the interface and the determined value indicative of a rate of energy absorption.

12. The apparatus of claim 11, wherein the interface is configured to receive information from a reader adapted to transfer information from a machine readable element.

13. The apparatus of claim 12, wherein the machine readable element includes one or more of an RFID tag, a barcode, or combinations thereof.

14. The apparatus of claim 11, wherein the interface is configured to receive information from a man-machine interface device.

15. The apparatus of claim 11, wherein the interface is configured to receive information via a network connection.

16. The apparatus of claim 11, wherein the at least one processor is configured to determine the estimated amount of time by a process including dividing the value indicative of the total amount of energy to deliver to the load by the value indicative of the rate of energy absorption by the load.

17. The apparatus of claim 11, wherein the at least one processor is configured to determine the estimated amount of time by a process including multiplying the value indicative of the total amount of energy to deliver to the load by a predetermined factor and then dividing by the value indicative of the rate of energy absorption by the load.

18. The apparatus of claim 17, wherein the predetermined factor is at least 1.0.

19. The apparatus of claim 1, wherein the desired characteristic includes a predetermined temperature of the object, and the at least one processor is configured to determine the estimated amount of time in a process including determining an amount of energy needed to achieve the predetermined temperature of the object and dividing the amount of energy needed by the value indicative of the rate of energy absorption by the load.

20. The apparatus of claim 19, wherein determining the amount of energy needed to achieve the predetermined temperature of the object is based at least on an initial temperature associated with the object, a mass associated with the object, and an energy transfer coefficient associated with the object.

21. The apparatus of claim 20, wherein the energy transfer coefficient is greater than a heat capacity value associated with the object.

22. The apparatus of claim 20, further comprising a temperature sensor, and wherein the at least one processor is configured to determine the initial temperature associated with the object based on an output of the temperature sensor.

23. The apparatus of claim 20, further comprising a weight sensor, and wherein the at least one processor is configured to determine the mass associated with the object based on an output of the weight sensor.

24. The apparatus of claim 1, wherein the desired characteristic includes a predetermined level of resiliency of the object, and the at least one processor is configured to determine the estimated amount of time in a process including determining an amount of energy needed to achieve the predetermined level of resiliency of the object and dividing the amount of energy by the value indicative of the rate of energy absorption by the load.

25. The apparatus of claim 24, wherein determining the amount of energy needed to achieve the predetermined level of resiliency of the object is based at least on a mass associated with the object and an energy transfer coefficient associated with the object.

26. The apparatus of claim 1, wherein the at least one processor is configured to determine the estimated amount of time by:
determining an amount of energy needed to raise a temperature of the object to a predetermined level and dividing the amount of energy by the value indicative of the rate of energy absorption by the load to obtain a temperature rise time; and
adding to the temperature rise time another length of time during which the temperature of the object is to be maintained at the predetermined level.

27. The apparatus of claim 26, wherein the desired characteristic includes a predetermined level of resiliency of the object.

28. The apparatus of claim 26, wherein determining the amount of energy needed to raise the temperature of the object to a predetermined level is based at least on an initial temperature associated with the object, a mass associated with the object, and an energy transfer coefficient associated with the object.

29. The apparatus of claim 1, wherein the object contributes to at least a portion of the load.

30. The apparatus of claim 1, wherein the first period of time has a length between 1 millisecond and thirty seconds.

31. The apparatus of claim 1, wherein the first period of time has a length of less than 0.5 seconds.

32. The apparatus of claim 1, wherein the object rotates in the energy application zone, and the first period of time has a length at least as long as a period of rotation for the object.

33. The apparatus of claim 1, wherein the object moves in the energy application zone, and the value indicative of the rate of energy absorption by the load includes a time-averaged value determined, at least in part, based on measurements acquired as the object moves.

34. The apparatus of claim 1, wherein the estimated amount of time is greater than the first period of time by a factor of between fifteen and 1000.

35. The apparatus of claim 1, wherein the estimated amount of time is greater than the first period of time by a factor of between 15,000 to 150,000.

36. The apparatus of claim 1, wherein the at least one processor is configured to issue one or more user prompts once the estimated amount of time has elapsed.

37. The apparatus of claim 1, wherein the at least one processor is configured to display the estimated amount of time on a display unit.

38. The apparatus of claim 1, wherein determining the value indicative of the rate of energy absorption by the load comprises measuring RF radiation in the energy application zone.

39. The apparatus of claim 1, further comprising an energy application zone.

40. The apparatus of claim 39, wherein the source is configured to supply RF energy to the energy application zone.

* * * * *